(12) United States Patent
Dalmatov et al.

(10) Patent No.: US 11,294,583 B2
(45) Date of Patent: Apr. 5, 2022

(54) PROACTIVE ALLOCATION OF NON-VOLATILE DATA STORAGE TO STORAGE OBJECTS IN A DATA STORAGE SYSTEM TO ANTICIPATE STORAGE OBJECT ACCESS TRENDS

(71) Applicant: EMC IP Holding Company LLC, Hopkinton, MA (US)

(72) Inventors: Nickolay Alexandrovich Dalmatov, Saint Petersburg (RU); Kirill Alexsandrovich Bezugly, Saint-Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 552 days.

(21) Appl. No.: 16/344,081

(22) PCT Filed: Apr. 26, 2018

(86) PCT No.: PCT/RU2018/000276
§ 371 (c)(1),
(2) Date: Apr. 23, 2019

(87) PCT Pub. No.: WO2019/209133
PCT Pub. Date: Oct. 31, 2019

(65) Prior Publication Data
US 2021/0357135 A1    Nov. 18, 2021

(51) Int. Cl.
*G06F 3/06* (2006.01)

(52) U.S. Cl.
CPC ............ *G06F 3/0631* (2013.01); *G06F 3/065* (2013.01); *G06F 3/0611* (2013.01);
(Continued)

(58) Field of Classification Search
CPC ............... G06F 3/0653; G06F 3/0614; G06F 2209/5019; G06F 3/061; G06F 3/0617;
(Continued)

(56) References Cited

U.S. PATENT DOCUMENTS 7,363,453 B1   4/2008  Arnan et al.
10,007,626 B1  6/2018  Saad et al.
(Continued)

OTHER PUBLICATIONS

Notification of Transmittal of the International Search Report and the Written Opinion of the International Searching Authority, or the Declaration mailed from the International Searching Authority dated Jan. 17, 2019, for International Application No. PCT/RU2018/000276, International Filing Date: Apr. 26, 2018, 9 pages.

*Primary Examiner* — Reginald G Bragdon
*Assistant Examiner* — Thanh D Vo
(74) *Attorney, Agent, or Firm* — BainwoodHuang

(57) ABSTRACT

Technology for proactively allocating data storage resources to a storage object. A rate at which host I/O operations directed to the storage object are received and/or processed is monitored during a monitored time period, and a high activity time range is identified. An anticipatory time range is defined that is a range of time immediately preceding the high activity time range. During the anticipatory time range within a subsequent time period following the monitored time period, high performance non-volatile storage is allocated to the storage object that is available for processing host I/O operations directed to the storage object at the beginning of and throughout the high activity time range. A low activity time range may also be identified, and lower performance non-volatile storage may be allocated to the storage object within an anticipatory time range immediately preceding the low activity time range.

20 Claims, 3 Drawing Sheets

(52) U.S. Cl.
CPC .......... *G06F 3/0653* (2013.01); *G06F 3/0679* (2013.01); *G06F 3/0683* (2013.01); *G06F 2201/81* (2013.01); *G06F 2209/5019* (2013.01); *G06F 2212/1016* (2013.01)

(58) Field of Classification Search
CPC .... G06F 3/0647; G06F 3/0631; G06F 3/0644; G06F 3/0683; G06F 3/0689; G06F 2201/81; G06F 2201/87; G06F 3/0688; G06F 3/0611; G06F 3/065; G06F 3/0679
See application file for complete search history.

(56) References Cited

U.S. PATENT DOCUMENTS

| | | |
|---|---|---|
| 10,203,907 B2 | 2/2019 | Yang et al. |
| 10,474,383 B1 | 11/2019 | Wang et al. |
| 10,484,301 B1 * | 11/2019 | Shukla ................ H04L 41/0896 |
| 2013/0290669 A1 | 10/2013 | Lowe et al. |
| 2014/0068221 A1 * | 3/2014 | Feng ..................... G06F 12/023 711/170 |
| 2016/0320980 A1 | 11/2016 | Fang et al. |

* cited by examiner

PROACTIVE ALLOCATION OF NON-VOLATILE DATA STORAGE TO STORAGE OBJECTS IN A DATA STORAGE SYSTEM TO ANTICIPATE STORAGE OBJECT ACCESS TRENDS

BACKGROUND

Data storage systems are arrangements of hardware and software that typically include multiple storage processors coupled to non-volatile data storage devices, such as magnetic disk drives, electronic flash drives, and/or optical drives. The storage processors service host I/O operations received from host applications running on host machines. The received host I/O operations specify one or more data storage objects to which they are directed (e.g. logical disks or "LUNs"), and indicate host I/O data that is to be written to or read from the storage objects. The storage processors include specialized hardware and execute specialized software that processes the incoming host I/O operations and that performs various data storage tasks that organize and secure the host I/O data that is received from the host applications and stored on non-volatile data storage devices of the data storage system.

In some previous data storage systems, non-volatile storage devices have been organized into physical disk groups based on the level of performance they provide. The different disk groups provide different performance "tiers" that are available within the data storage system, with higher performance disk groups (e.g. made up of solid state drives) providing higher performance tiers to the storage objects, and lower performance disk groups (e.g. made up of magnetic disk drives) providing lower performance tiers to the storage objects.

In some previous systems, a performance tier "hint" is associated with each storage object. The hint for a given storage object represents the preferred performance tier from which non-volatile storage is to be allocated to that storage object for storing host data written to that storage object. Accordingly, when a hint for a storage object has a value indicating a preference for high performance non-volatile storage (e.g. "HIGH PERFORMANCE TIER"), then the data storage system responds to the hint by attempting to allocate non-volatile storage to that storage object from one or more disk groups made up of high performance disk drives. In contrast, when a hint for a storage object has a value indicating a preference for low performance non-volatile storage (e.g. "LOW PERFORMANCE TIER"), then the data storage system would respond to the hint by allocating non-volatile storage to that storage object from one or more disk groups made up of lower performance disk drives. In this way, a hint could be assigned to a storage object that reflected the type of host data that was written to the storage object. For example, a storage object created to store archived host data could be associated with a hint indicating a preference for a lowest available performance tier (e.g. "LOWEST AVAILABLE TIER"), so that the non-volatile storage used to store the host data written to the storage object would not be allocated from a high performance disk group, allowing such relatively costly high performance disk resources to instead be allocated for use in storing host data of a different type, i.e. that is typically more frequently accessed than archived data.

SUMMARY

Previous systems have exhibited significant shortcomings In particular, previous systems have statically maintained the performance tier hints that are associated with the storage objects they provide. Statically maintained performance tier hints are not capable of reflecting the different levels of access intensiveness that may occur during the life cycle of a storage object. For example, a storage object used to store a tax agency database may be accessed very intensively during a relatively short time period during which tax filings are submitted each year. During that limited time period, a performance tier hint indicating a preference for higher performance non-volatile storage would be appropriate. However, during the remainder of the year, a performance tier hint indicating a preference for lower performance non-volatile storage would be more appropriate. If the static performance tier hint for the tax agency database is simply set to a preference for high performance non-volatile storage, then the overall performance of the data storage system is adversely affected because high performance non-volatile storage allocated to the data object is inefficiently allocated during those time periods when the data storage object is accessed less intensively, since the allocated high performance non-volatile storage is not needed by the tax agency database during that time, and may instead be better allocated during that time to store more intensively accessed host data. On the other hand, if the static performance tier hint for the tax agency database is instead set to a preference for lower performance non-volatile storage, the performance of the host I/O operations directed to the storage object in the time period during which the storage object is more intensively accessed would be adversely impacted by the high response times of the lower performance non-volatile storage.

In some previous data storage systems, attempts to solve these problems have sometimes involved a system administrator user or the like having to manually change the static hint for a storage object in order to adapt the system's storage allocation to the storage object to a change in access intensiveness. Such approaches are undesirable because they require a user to accurately recognize the need for the change in allocation, and for the user to manually intervene in order to cause an appropriate change in non-volatile storage allocation.

Some other previous data storage systems have attempted to adapt to a change in the level of access intensiveness for a storage object by modifying the performance tier hint for the storage object at the time the change in access intensiveness is detected. Such approaches suffer from latency because changes in access intensiveness can typically only be reliably detected after a time lag, in order to filter out transient spikes in accesses to the storage object.

To address these and other shortcomings of previous systems, improved technology is described herein for proactively allocating data storage resources to a storage object in order to anticipate storage object access trends. In the disclosed technology, a rate at which host I/O operations directed to the storage object are received and/or processed is monitored during a monitored time period. Based on the monitoring of the rate at which host I/O operations directed to the storage object are received and/or processed during the monitored time period, a high activity time range is identified within the monitored time period. Identifying the high activity time range within the monitored time period includes detecting that the rate at which host I/O operations directed to the storage object are received and/or processed during the high activity time range within the monitored time period is higher than the rate at which host I/O operations directed to the storage object are received and/or processed during the remainder of the monitored time period outside the high activity time range.

Further in the disclosed technology, an anticipatory time range is defined for the individual storage object. The anticipatory time range is a range of time immediately preceding the high activity time range for the storage object. During the anticipatory time range within a subsequent time period following the monitored time period, a predetermined amount of high performance non-volatile storage is allocated to the storage object. Advantageously, the predetermined amount of high performance non-volatile storage allocated to the storage object during the anticipatory time range is available for processing host I/O operations directed to the storage object that are received at the beginning of and throughout the high activity time range within the subsequent time period.

In some embodiments, during the anticipatory time range within the subsequent time period, the disclosed technology copies host data previously written to the storage object and stored in low-performance non-volatile storage previously allocated to the storage object, from the low-performance non-volatile storage previously allocated to the storage object, to the high performance non-volatile storage allocated to the storage object during the anticipatory time range, prior to the beginning of the high activity time range during the subsequent time period. After copying the host data previously written to the storage object and stored in the low-performance non-volatile storage previously allocated to the storage object from the low-performance non-volatile storage previously allocated to the storage object to the high performance non-volatile storage allocated to the storage object during the anticipatory time range, the disclosed technology may deallocate the low-performance non-volatile storage previously allocated to the storage object for re-allocation to one or more other storage objects.

In some embodiments, the predetermined amount of high performance non-volatile storage allocated to the storage object during the anticipatory time range within the subsequent time period may be equal in size to an amount of host data previously written to the storage object and currently stored in the low-performance non-volatile storage previously allocated to the storage object.

In some embodiments, the disclosed technology calculates a size of a working set for the storage object. The size of the working set calculated for the storage object may be equal to an amount of non-volatile storage that is typically used to process host I/O operations directed to the storage object during the high activity time range. The predetermined amount of high performance non-volatile storage allocated to the storage object during the anticipatory time range within the subsequent time period may be equal in size to the size of the working set for the storage object.

In some embodiments, the low performance non-volatile storage previously allocated to the storage object is made up of non-volatile storage allocated to the storage object from at least one magnetic hard disk drive.

In some embodiments, allocating the predetermined amount of high performance non-volatile storage to the storage object is performed by allocating the predetermined amount of high performance non-volatile storage to the storage object from at least one solid state drive.

In some embodiments, the length of the anticipatory time range is calculated as a length of time that is at least sufficient for the storage processor to completely copy the host data previously written to the storage object and currently stored in low-performance non-volatile storage previously allocated to the storage object, from the low-performance non-volatile storage previously allocated to the storage object, to the high performance non-volatile storage allocated to the storage object during the anticipatory time range.

In some embodiments, each storage object may be associated with a storage object type. In response to identifying a second storage object having the same associated object type as a first storage object, some embodiments of the disclosed technology may define the same anticipatory time range for the second storage object as was previously defined for the first storage object. Further in response to identifying a second storage object having the same associated object type as the first storage object, embodiments of the disclosed technology may, during the anticipatory time range previously defined for the first storage object within the subsequent time period following the monitored time period, allocate a second predetermined amount of high performance non-volatile storage to the second storage object. The second predetermined amount of high performance non-volatile storage allocated to the second storage object during the anticipatory time range is also available for processing host I/O operations directed to the second storage object and received at the beginning of the high activity time range during the subsequent time period.

In some embodiments, further in response to monitoring the rate at which host I/O operations are directed to the storage object, a low activity time range may be identified for the storage object within the monitored time period. Identifying the low activity time range within the monitored time period may include detecting that a rate at which host I/O operations directed to the storage object are received and/or processed during the low activity time range within the monitored time period is lower than a rate at which host I/O directed to the storage object are received and/or processed during a remainder of the monitored time period outside the low activity time range. In response to the low activity time range, a second anticipatory time range may be defined. The second anticipatory time range may be a range of time immediately preceding the low activity time range. During the second anticipatory time range within the subsequent time period following the monitored time period, a predetermined amount of low performance non-volatile storage may be allocated to the storage object. The predetermined amount of low performance non-volatile storage allocated to the storage object during the second anticipatory time range is available for processing host I/O operations directed to the storage object and received at the beginning of and throughout the low activity time range during the subsequent time period.

Embodiments of the technology described herein may provide significant advantages over previous approaches. For example, by automatically calculating an anticipatory time range preceding a high activity time range or a low activity time range, and proactively allocating appropriate non-volatile storage for a subsequent high activity time range or low activity time range, embodiments of the disclosed eliminate the latency inherent in previous solutions that operated by changing non-volatile storage allocations only after detecting a non-transient change in the activity level for a storage object. In addition, the disclosed technology also eliminates the need for manual changing of performance tier hints that are associated with storage objects to cause the types of non-volatile storage allocated to storage objects to be changed.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
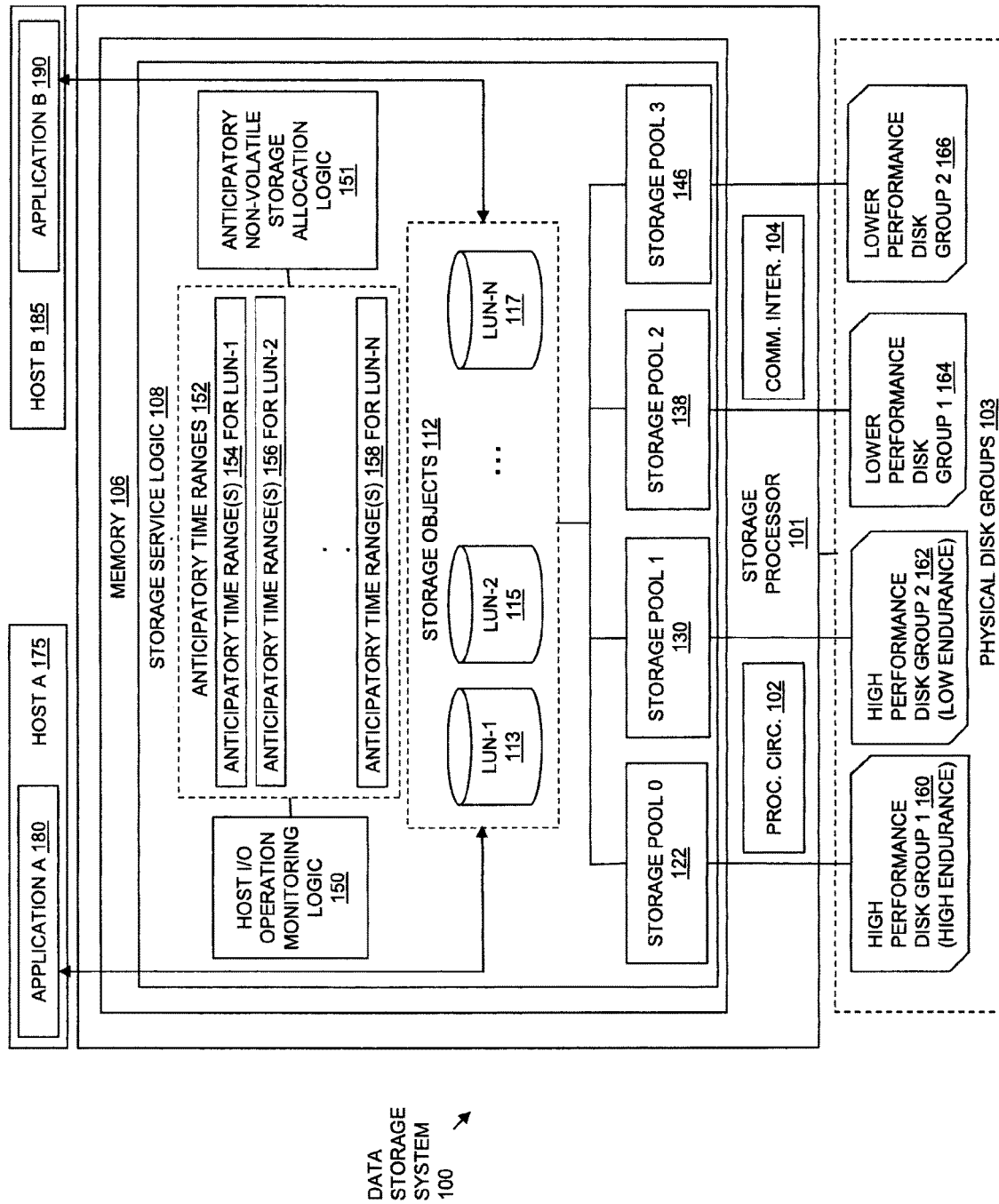
FIG. 1 is a block diagram showing an operational example of a data storage environment including components in an embodiment of the disclosed technology.

Embodiments of the invention will now be described. It should be understood that the embodiments described herein are provided by way of example to illustrate various features and principles of the invention, and that the invention hereof is broader than the specific example embodiments disclosed.

The techniques for proactively allocating data storage resources to a storage object described herein include monitoring a rate at which host I/O operations directed to the storage object are received and/or processed during a monitored time period. In response to monitoring the rate at which host I/O operations directed to the storage object are received and/or processed, a high activity time range is identified within the monitored time period. Identifying the high activity time range within the monitored time period may include detecting that a rate at which host I/O operations directed to the storage object are received and/or processed during the high activity time range within the monitored time period is higher than a rate at which host I/O operations directed to the storage object are received and/or processed during a remainder of the monitored time period outside of the high activity time range. An anticipatory time range is defined in response to the high activity time range, where the anticipatory time range consists of a range of time immediately preceding the high activity time range. During the anticipatory time range within a subsequent time period following the monitored time period, an amount of high performance non-volatile storage is allocated to the storage object. The high performance non-volatile storage allocated to the storage object during the anticipatory time range is available for processing host I/O operations directed to the storage object that are received at the beginning of the high activity time range during the subsequent time period.

The techniques for proactively allocating data storage resources to a storage object described herein further include identifying a low activity time range within a monitored time period. Identifying the low activity time range within the monitored time period includes detecting that a rate at which host I/O operations directed to the storage object are received and/or processed during the low activity time range within the monitored time period is lower than a rate at which host I/O operations directed to the storage object are received and/or processed during a remainder of the monitored time period outside the low activity time range. An anticipatory time range may be defined for the storage object in response to identifying the low activity time range. The anticipatory time range may be a range of time immediately preceding the low activity time range. During the anticipatory time range within the subsequent time period following the monitored time period, an amount of low performance non-volatile storage is allocated to the storage object. The low performance non-volatile storage allocated to the storage object during the anticipatory time range immediately preceding the low activity time range is available for processing host I/O operations directed to the storage object at the beginning of the low activity time range during the subsequent time period.

FIG. 1 is a block diagram showing an example of a data storage environment including components in an embodiment of the disclosed technology. As shown in FIG. 1, multiple host computing devices, shown by Host A 175 and Host B 185, include host applications executing thereon, e.g. Application A 180 executing on Host A 175 and Application B 190 executing on Host B 185. Host A 175 and Host B 185 access non-volatile data storage provided by Data Storage System 100, for example over one or more computer networks, such as a local area network (LAN), and/or a wide area network (WAN) such as the Internet, etc. Data Storage System 100 includes a Storage Processor 101 and Physical Disk Groups 103. The Data Storage System 100 may include one or more storage processors like Storage Processor 101. Storage Processor 101 may be provided as a circuit board assembly, or "blade," which plugs into a chassis that encloses and cools multiple storage processors, and that has a backplane for interconnecting storage processors. However, no particular hardware configuration is required, and Storage Processor 101 may be embodied as any specific type of computing device capable of processing host input/output (I/O) operations (e.g. I/O reads and I/O writes).

Physical Disk Groups 103 may be directly physically connected to Storage Processor 101, or may be communicably connected to Storage Processor 101 by way of one or more computer networks. Physical Disk Groups 103 organize non-volatile storage devices by the level of performance they provide, in terms of response time and/or write endurance in the case of solid state drives (SSDs). High Performance Disk Group 1 160 and High Performance Disk Group 2 162 are each made up of some number of high performance non-volatile storage devices. For example, both High Performance Disk Group 1 160 and High Performance Disk Group 2 162 may consist of one or more solid state drives (SSDs). Due to the characteristics of NAND flash, SSDs have a finite lifetime in terms of the number of write operations they can process, based on the number of program/erase (P/E) cycles that NAND flash can endure. Different types of SSDs provide different levels of write endurance, with higher endurance SSDs typically having a higher cost. For example, Single-Level Cell (SLC) NAND Flash, which uses a single cell to store one bit of data, provides a relatively high level of write endurance, but at relatively higher cost. In another example, Multiple Level Cell (MLC)-based SSDs that use multiple bits per cell to store more bits typically cost less, but have relatively low write endurance. In the example of FIG. 1, High Performance Disk Group 1 160 are made up of SSDs having relatively high write endurance levels (e.g. more costly SLC flash SSDs), while High Performance Disk Group 2 162 are made up of SSDs having relatively lower write endurance levels (e.g. less costly MLC-based SSDs).

The lower performance disk groups shown by Lower Performance Disk Group 1 164, and Lower Performance Disk Group 2 166, are each made up of non-volatile storage devices that have lower performance in terms of response time than the non-volatile storage devices in High Performance Disk Group 1 160 and High Performance Disk Group 2 162. For example, the non-volatile storage devices in Lower Performance Disk Group 1 164 and Lower Performance Disk Group 2 166 may consist of a number of magnetic hard disk drives. Because the response time provided by magnetic hard disk drives is higher than the response time provided by the flash drives of High Performance Disk Group 1 160 and High Performance Disk Group 2 162, the non-volatile storage provided by each of Lower Performance Disk Group 1 164 and Lower Performance Disk Group 2 166 provides lower performance than the non-volatile storage provided by High Performance Disk Group 160.

Storage Processor 101 includes one or more Communication Interfaces 104, Processing Circuitry 102, and Memory 106. Communication Interfaces 104 enable Storage Processor 101 to communicate with Host A 175, Host B 185, and Physical Disk Groups 103 over one or more computer networks, and may include, for example, SCSI and/or other network interface adapters for converting electronic and/or optical signals received over one or more networks into electronic form for use by the Storage Processor 101. The Processing Circuitry 102 may, for example, include or consist of one or more microprocessors, e.g. central processing units (CPUs), multi-core processors, chips, and/or assemblies, and associated circuitry. Memory 106 may include volatile memory (e.g., RAM), and/or non-volatile memory, such as one or more ROMs, disk drives, solid state drives, and the like. Processing Circuitry 102 and Memory 108 together form control circuitry, which is constructed and arranged to carry out various methods and functions as described herein. The Memory 108 stores a variety of software components that may be provided in the form of executable program code. For example, as shown in FIG. 1, Memory 108 may include software components such as Storage Service Logic 108. When the program code is executed by Processing Circuitry 102, Processing Circuitry 102 is caused to carry out the operations of the software components. Although certain software components are shown and described for purposes of illustration and explanation, those skilled in the art will recognize that Memory 108 may include various other software components, such as an operating system, and various other applications, processes, etc.

During operation of the components shown in FIG. 1, Storage Service Logic 108 provides data storage for use by one or more applications to data. In the example of FIG. 1, Storage Service Logic 108 provides Storage Objects 112 to store data that is generated and/or used by Application A 180 and/or Application B 190. The Storage Objects 112 may, for example, include some number of logical disks (LUNs), shown by LUN-1 113, LUN-2 115, and so on through LUN-N 117. The Storage Objects 112 are provided by Storage Service Logic 108 using units of non-volatile storage allocated from the Physical Disk Groups 103.

Those skilled in the art will recognize that while the storage objects in the example of FIG. 1 are shown for purposes of illustration and explanation as LUNs, the disclosed techniques are not limited to use with LUNs. Alternatively, or in addition, the disclosed techniques may be applied to other types of storage objects that may be provided by the Storage Processor 101 to store data on behalf of one or more applications, such as host file systems, and/or VVols (virtual volumes, such as a virtual machine disk, e.g., as available from VMware, Inc. of Palo Alto, Calif.).

Further during operation of the embodiment shown in FIG. 1, Storage Service Logic 108 uses Storage Pool 0 122, Storage Pool 1 130, Storage Pool 2 138, and Storage Pool 3 146 to allocate storage resources from the Physical Disk Groups 103 to the storage objects 112. For example, the units of storage provided from the Physical Disk Groups 103 by each one of the storage pools may be units of storage that are generally referred to as extents, which are allocated from respective ones of the Physical Disk Groups 103 through the corresponding storage pools to Storage Objects 112. The extents provided as units of storage to Storage Objects 112 from storage pools 122, 130, 138 and 146 may be various specific increments of non-volatile storage space, e.g. 128 MB, 256 MB, 1 GB in size.

Each storage pool includes indications of the organization and/or amounts or sizes of the allocated and unallocated units of non-volatile storage managed by the storage pool, as well as indications (e.g. locations) of units of non-volatile storage in the non-volatile storage devices in the respective physical disk group that are currently allocated to storing host data in specific storage objects, and/or that are free and currently unallocated but available for allocation. In the example of FIG. 1, Storage Pool 0 122 includes indications of the units of storage allocated from High Performance Disk Group 1 160 to specific storage objects in Storage Objects 112, and indications of units of storage in High Performance Disk Group 1 160 that are available for allocation. Storage Pool 1 130 includes indications of the units of storage allocated from High Performance Disk Group 2 162 to specific storage objects in Storage Objects 112, and indications of units of storage in High Performance Disk Group 2 160 that are available for allocation. Storage Pool 2 138 includes indications of the units of storage allocated from Lower Performance Disk Group 1 164 to specific storage objects in Storage Objects 112, and indications of units of storage in Lower Performance Disk Group 1 164 that are available for allocation. And Storage Pool 3 146 includes indications of the units of storage allocated from Lower Performance Disk Group 2 166 to specific storage objects in Storage Objects 112, and indications of units of storage in Lower Performance Disk Group 2 166 that are available for allocation.

Further during operation of the embodiment shown in FIG. 1, in order to proactively allocate non-volatile storage from the Physical Disk Groups 103 to the Storage Objects 112, Host I/O Operation Monitoring Logic 150 monitors the rate at which host I/O operations from Host A 175 and/or Host B 185 that are directed to individual ones of the LUNs in the Storage Objects 112 are received and/or processed during a monitored time period. Those skilled in the art will recognize that the rate at which host I/O operations directed to a storage object such as a LUN are received and/or processed may reflect the rate at which individual I/O operations directed to the storage object are received, and/or the size of the host data indicated by individual received I/O operations. Based on the monitored rate at which host I/O operations directed to individual storage objects are received and/or processed during the monitored time period, Host I/O Operation Monitoring Logic 150 identifies a high activity time range within the monitored time period for one or more of the LUNs in Storage Objects 112. The Host I/O Operation Monitoring Logic 150 may identify the high activity time range within the monitored time period for one of the LUNs in Storage Objects 112 by detecting that the rate at which host I/O operations directed to that LUN are received and/or processed by Storage Processor 101 during the high activity time range within the monitored time period is higher than the rate at which host I/O operations directed to the LUN are received and/or processed by Storage Processor 101 during the remainder of the monitored time period outside the high activity time range.

Further during operation of the embodiment shown in FIG. 1, Host I/O Operation Monitoring Logic 150 may define an anticipatory time range for one or more of the LUNs in Storage Objects 112. The anticipatory time range defined by Host I/O Operation Monitoring Logic 150 for a given LUN within Storage Objects 112 may consist of a range of time immediately preceding the high activity time range identified for that LUN.

As shown in the example of FIG. 1, Anticipatory Time Ranges 108 generated by Host I/O Operation Monitoring Logic 150 may include descriptions of one or more anticipatory time ranges for each individual LUN in Storage Objects 112, shown for purposes of illustration by Anticipatory Time Range(s) 154 for LUN-1, Anticipatory Time Range(s) 156 for LUN-2, and so on through Anticipatory Time Range(s) 158 for LUN-N. Each anticipatory time range in Anticipatory Time Ranges 108 may include a start time, and a duration or end time, for one or more anticipatory time ranges associated with a corresponding one of the Storage Objects 112. Anticipatory Time Ranges 152 may be embodied using a table, database, or any other appropriate data structure for a given embodiment.

Further during operation of the components shown in FIG. 1, during the anticipatory time range for one of the LUNs in Storage Objects 112, but within a subsequent time period following the monitored time period, Anticipatory Non-Volatile Storage Allocation Logic 151 may allocate some amount of high performance non-volatile storage, e.g. from High Performance Disk Group 1 160 through Storage Pool 0 122, or from High Performance Disk Group 2 162 through Storage Pool 1 130, to that LUN. Advantageously, the high performance non-volatile storage allocated to the LUN during the anticipatory time range for the LUN is available to Storage Service Logic 108 for processing host I/O operations directed to that LUN that are received for processing by Storage Processor 101 at the beginning of and throughout the high activity time range for the LUN within the subsequent time period. For example, the high performance non-volatile storage allocated to the LUN during the anticipatory time range is available to Storage Service Logic 108 for storing host data indicated by one or more host I/O write operations directed to that LUN and received for processing by Storage Processor 101 at the beginning of and then throughout the high activity time range for the LUN within the subsequent time period. Anticipatory Non-Volatile Storage Allocation Logic 151 may also deallocate the high performance non-volatile storage allocated to the LUN during anticipatory time range at or after the end of the high activity time range for the LUN, for reallocation to one or more other LUNs.

In some embodiments, Anticipatory Non-Volatile Storage Allocation Logic 151 may allocate the predetermined amount of high performance non-volatile storage to a given LUN by allocating high performance non-volatile storage to the LUN that is located on at least one solid state drive within High Performance Disk Group 1 160 and/or High Performance Disk Group 2 162, e.g. using Storage Pool 0 122 and/or Storage Pool 1 130.

In some embodiments, during the anticipatory time range within the subsequent time period, the Anticipatory Non-Volatile Storage Allocation Logic 151 may copy host data previously written to a LUN, and that is stored in low-performance non-volatile storage that was previously allocated to that LUN (e.g. from Lower Performance Disk Group 1 164 or Lower Performance Disk Group 2 166), from the low-performance non-volatile storage previously allocated to the LUN, to the high performance non-volatile storage allocated to the LUN during the anticipatory time range, prior to the beginning of the high activity time range during the subsequent time period. After copying the host data previously written to the LUN and stored in the low-performance non-volatile storage previously allocated to the LUN from the low-performance non-volatile storage previously allocated to the LUN to the high performance non-volatile storage allocated to the LUN during the anticipatory time range, the Anticipatory Non-Volatile Storage Allocation Logic 151 may deallocate the low-performance non-volatile storage previously allocated to the LUN for re-allocation to one or more other storage objects, e.g. by deallocating the low performance non-volatile storage previously allocated to the LUN into Storage Pool 2 138 or Storage Pool 3 146.

In some embodiments, the low performance non-volatile storage previously allocated to a LUN may be non-volatile storage allocated to the LUN that is located on at least one magnetic hard disk drive, e.g. from a magnetic hard disk drive in Lower Performance Disk Group 1 164 through Storage Pool 2 138, or from a magnetic hard disk drive in Lower Performance Dick Group 2 156 through Storage Pool 3 146.

In some embodiments, Host I/O Operation Monitoring Logic 150 and/or Anticipatory Non-Volatile Storage Allocation Logic 151 may calculate the predetermined amount of high performance non-volatile storage that is to be allocated to a given LUN during the anticipatory time range for that LUN within a subsequent time period as an amount of non-volatile storage that is equal in size to an amount of host data that was previously written to the LUN, and that is currently stored in low-performance non-volatile storage previously allocated to the LUN. In this way the amount of high performance non-volatile storage allocated to the LUN in anticipation of the high activity time range for the LUN may be sufficient to store all of the host data previously written to the LUN and currently stored in low-performance non-volatile storage that was previously allocated to the LUN, thus enabling complete replacement, during the high activity time range for the LUN, of all the low-performance non-volatile storage that was previously allocated to the LUN, by the high performance non-volatile storage allocated to the LUN during the anticipatory time range for the LUN, prior to the beginning of the high activity time range for the LUN.

In some embodiments, Host I/O Operation Monitoring Logic 150 and/or Anticipatory Non-Volatile Storage Allocation Logic 151 may calculate a size of a working set for a LUN. The size of the working set calculated for a given LUN may be equal to an amount of non-volatile storage that is typically used to process host I/O operations directed to that LUN during the LUN's high activity time range, e.g. an average amount of non-volatile storage used to process host I/O operations directed to the LUN during the high activity time range. The amount of high performance non-volatile storage allocated to the LUN object during the anticipatory time range for the LUN within the subsequent time period may then be equal in size to the size of the working set calculated for the LUN.

In some embodiments, Host I/O Operation Monitoring Logic 150 may calculate the length of the anticipatory time range for a LUN as a length of time that is at least sufficient to completely copy the host data previously written to the LUN and currently stored in low-performance non-volatile storage previously allocated to the LUN, from the low-performance non-volatile storage previously allocated to the LUN, to the high performance non-volatile storage allocated to the LUN during the anticipatory time range for the LUN.

In some embodiments, individual LUNs in Storage Objects 112 may each be associated with a storage object type. For example, some number of LUNs that are used to store a tax agency database may be associated with the "TAX-FILING-DATA" type. After Host I/O Operation Monitoring Logic 150 identifies an anticipatory time range for a first one of the LUNs that is associated with the "TAX-FILING-DATA" type, Host I/O Operation Monitoring Logic 150 may identify a second LUN that is also associated with the "TAX-FILING-DATA" type. In response to identifying the second LUN associated with the "TAX-FILING-DATA" type, Host I/O Operation Monitoring Logic 150 may then define the same anticipatory time range for the second LUN associated with the "TAX-FILING-DATA" type as was previously defined for the first LUN associated with that type. In this way, LUNs having the same associated type can efficiently be assigned the same anticipatory time range.

In some embodiments, Anticipatory Non-Volatile Storage Allocation Logic 151 may identify a second LUN having the same associated type as a first LUN (e.g. "TAX-FILING-DATA"), and in response to identifying the second LUN having the same associated type as the first LUN, during the anticipatory time range previously defined for the first LUN, within the subsequent time period following the monitored time period, in addition to allocating the predetermined amount of high performance non-volatile storage to the first LUN, also allocate the predetermined amount of high performance non-volatile storage to the second LUN. In this way, the predetermined amount of high performance non-volatile storage may also allocated to the second LUN during the anticipatory time period, based on the second LUN having the same associated type as the first LUN, and resulting in the predetermined amount of high performance non-volatile storage also being available for processing host I/O operations directed to the second storage object that are received at the beginning of and throughout the high activity time range during the subsequent time period.

In some embodiments, further in response to monitoring the rate at which host I/O operations directed to individual LUNs are received and/or processed by Storage Processor 101 during the monitoring time period, Host I/O Operation Monitoring Logic 150 may identify a low activity time range for one or more of the LUNs in Storage Objects 112. Identifying a low activity time range within the monitored time period may include detecting that a rate at which host I/O operations directed to a LUN are received and/or processed during the low activity time range within the monitored time period is lower than a rate at which host I/O operations directed to the LUN are received and/or processed during a remainder of the monitored time period outside the low activity time range. In response to identification of a low activity time range for a LUN, Host I/O Operation Monitoring Logic 150 may define an anticipatory time range for the low activity time range for the LUN. The anticipatory time range for the low activity time range may be a range of time immediately preceding the low activity time range for the LUN. The anticipatory time range for the low activity time range may be stored as an anticipatory time range for the LUN (e.g. a second anticipatory time range in addition to a first anticipatory time range for a high activity time range for the same LUN) in the Anticipatory Time Ranges 152.

Anticipatory Non-Volatile Storage Allocation Logic 151 may then, during the second anticipatory time range for the LUN within the subsequent time period following the monitored time period, allocate a predetermined amount of low performance non-volatile storage to the LUN. The low performance non-volatile storage allocated to the LUN by Anticipatory Non-Volatile Storage Allocation Logic 151 is available for processing host I/O operations directed to the storage object that are received for processing by the Storage Processor 101 at the beginning of and throughout the low activity time range during the subsequent time period.

In some embodiments, Host I/O Operation Monitoring Logic 150 may identify a high activity time range for a LUN within the monitored time period at least partly in response to detecting that a rate at which host I/O operations directed to the LUN are received and/or processed during the high activity time range within the monitored time period is greater than a maximum rate at which host I/O operations can be processed using non-volatile storage allocated from either Lower Performance Disk Group 1 164 or Lower Performance Disk Group 2 166. For example, Host I/O Operation Monitoring Logic 150 may identify a high activity time range for a LUN within the monitored time period at least partly in response to detecting that the rate at which host I/O operations directed to the LUN are received and/or processed during the high activity time range within the monitored time period is greater than a maximum IOPS that can be processed using the lower performance disk drives in Lower Performance Disk Group 1 164 and/or Lower Performance Disk Group 2 166.

In some embodiments, Host I/O Operation Monitoring Logic 150 may identify a high activity time range for a LUN within the monitored time period at least partly in response to detecting that a rate at which host I/O operations directed to the LUN are received and/or processed during the high activity time range within the monitored time period exceeds the rate at which host I/O operations directed to the storage object are received and/or processed during a remainder of the monitored time period outside the high activity time range by at least a predetermined difference threshold. For example, Host I/O Operation Monitoring Logic 150 may identify a high activity time range for a LUN within the monitored time period only at least partly in response to detecting that a rate at which host I/O operations directed to the LUN during the high activity time range within the monitored time period exceeds the rate at which host I/O operations directed to the storage object are received and/or processed during a remainder of the monitored time period outside the high activity time range by at least 100% of the rate at which host I/O operations directed to the storage object are received and/or processed during a remainder of the monitored time period outside the high activity time range.

In some embodiments, the Host I/O Operation Monitoring Logic 150 may monitor i) a rate at which write host I/O operations directed to individual LUNs are received and/or processed, and/or ii) a rate at which read host I/O operations directed to individual LUNs are received and/or processed. In such embodiments, for a given LUN the Host I/O Operation Monitoring Logic 150 may identify a high activity time range for write host I/O operations that are directed to that LUN, and/or a high activity time range for read host I/O operations that are directed to that LUN. In response to a high activity time range for write host I/O operations directed to an specific LUN, Anticipatory Non-Volatile Storage Allocation Logic 151 may allocate the predetermined amount of high performance non-volatile storage to the LUN during the anticipatory time period from High Performance Disk Group 1 160 through Storage Pool 0 122, since the solid state drives in High Performance Disk Group 1 160 have a higher write endurance than the solid state drives in High Performance Disk Group 2 162, and can therefore sustain a higher total number of write host I/O operations before they are worn out. In contrast, in response to a high activity time range for read host I/O operations directed to an individual LUN, Anticipatory Non-Volatile Storage Allocation Logic 151 may allocate the predetermined amount of high performance non-volatile storage to the LUN during the anticipatory time period from High Performance Disk Group 2 162 through Storage Pool 1 130, since the solid state drives in High Performance Disk Group 2 162 have lower write endurance than the solid state drives in High Performance Disk Group 1 160, and cannot sustain as high a total number of write host I/O operations before they are worn out.

In some embodiments, the high activity time range may be a time range during which a rate at which write host I/O operations directed to the storage object are received is higher than a rate at which write host I/O operations directed to the storage object are received during a remainder of the monitored time period outside the high activity time range, and allocating the high performance non-volatile storage to the storage object during the anticipatory time range may consist of allocating high performance non-volatile storage having a relatively high level of write endurance to the storage object during the anticipatory time range. For example, the solid state drives in High Performance Disk Group 1 160 may consist of 3WPD (three writes per day) solid state drives, and the solid state drives in High Performance Disk Group 2 162 may consist of 1WPD (one write per day) solid state drives. Host I/O Operation Monitoring Logic 150 may monitor the rate at which write host I/O operations are directed to an individual LUN, and the rate at which read host I/O operations are directed to the same LUN, in order to define anticipatory time periods during which one or the other of these specific types of solid state drives are to be used to for allocation of non-volatile storage to that LUN. For example, in the case of a LUN that is used as part of a data warehouse that is updated on weekends, and that accordingly receives a relatively higher level of write host write I/O operations during a high activity time range that consists of the weekend each week, Host I/O Operation Monitoring Logic 150 may define a relatively high write activity time range for the LUN that consists of the weekend, resulting in the automatic definition of an anticipatory time period immediately preceding the weekend during which a predetermined amount of non-volatile storage with relatively higher write endurance is allocated to the LUN, e.g. from the 3WPD solid state drive, in anticipation of the relatively write intensive host I/O traffic that will occur in the update of the date warehouse during the upcoming weekend. Following the weekend time range, non-volatile storage from the 1WPD solid state drives may then instead be allocated to the LUN to replace the 3WPD solid state drive non-volatile storage that was allocated to the LUN prior to the weekend.

In some embodiments, Anticipatory Non-Volatile Storage Allocation Logic 151 may operate to allocate high performance non-volatile storage to a LUN during the anticipatory time range for that LUN by changing a performance tier hint associated with the LUN during the anticipatory time range for the LUN. For example, Anticipatory Non-Volatile Storage Allocation Logic 151 may allocate high performance non-volatile storage to a LUN by changing a performance tier hint for the LUN from a performance tier hint indicating a lower performance disk group, e.g. "LOWER PERFORMANCE DISK GROUP 1", to a performance tier hint indicating a higher performance disk group, e.g. "HIGH PERFORMANCE DISK GROUP 1". In response to such a change in the performance tier hint, Storage Service Logic 108 may begin allocating high performance non-volatile storage to the LUN from High Performance Disk Group 1 160 through Storage Pool 0 122.

In some embodiments, Anticipatory Non-Volatile Storage Allocation Logic 151 may similarly operate to allocate low performance non-volatile storage to a LUN during the anticipatory time range for that LUN by changing a performance tier hint associated with the LUN during the anticipatory time range for the LUN. For example, Anticipatory Non-Volatile Storage Allocation Logic 151 may allocate low performance non-volatile storage to a LUN by changing a performance tier hint for the LUN from a performance tier hint indicating a high performance disk group, e.g. "HIGH PERFORMANCE DISK GROUP 1", to a performance tier hint indicating a higher performance disk group, e.g. "LOWER PERFORMANCE DISK GROUP 1". In response to such a change in the performance tier hint, Storage Service Logic 108 may begin allocating low performance non-volatile storage to the LUN from Lower Performance Disk Group 1 164 through Storage Pool 2 138.

Figure 2:
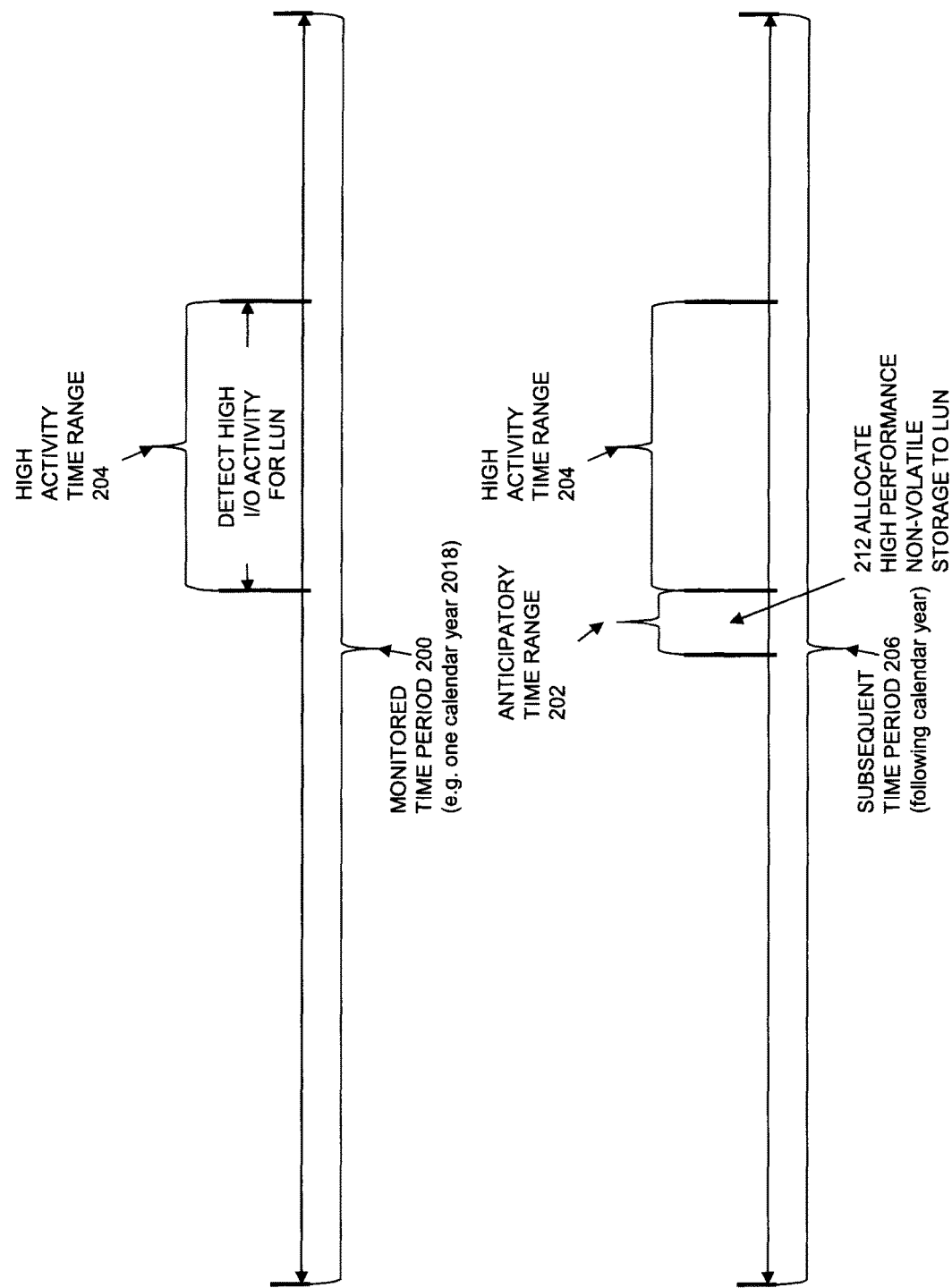
FIG. 2 illustrates operation of some embodiments of the disclosed technology to monitor the rate at which I/O operations directed to a storage object are received and/or processed, identify a high activity time range for the storage object, define an anticipatory time range for the storage object immediately preceding the high activity time range, and allocate high performance non-volatile storage to the storage object during the anticipatory time range within a subsequent time period.

FIG. 2 further illustrates operation of some embodiments of the disclosed technology to monitor the rate at which I/O operations directed to a storage object are received and/or processed, identify a high activity time range for the storage object, define an anticipatory time range for the storage object that occurs immediately preceding the high activity time range, and then allocate high performance non-volatile storage to the storage object during the anticipatory time range within a subsequent time period. As shown in the example of FIG. 2, Monitored Time Period 200 may be a specific calendar year, e.g. 2018, during which the disclosed technology monitors the rate at which host I/O operations that are directed to a LUN storage object are received and/or processed. The disclosed technology identifies High Activity Time Range 204 based on the monitored rate of host I/O operations during the Monitored Time Period 200. For example, High Activity Time Range 204 may be identified by the disclosed technology as a range of days from a starting day to an ending day, during which the rate at which host I/O operations directed to the LUN were received and/or processed by the storage processor exceeded the rate at which host I/O operations directed to the LUN were received and/or processed by the storage processor during the remainder of calendar year 2018 outside of High Activity Time Range 204, e.g. by more than a predetermined minimum difference threshold. High Activity Time Range 204 may further be identified by the disclosed technology as a range of days from a starting day to an ending day in 2018 during which the rate at which host I/O operations directed to the LUN were received and/or processed by the storage processor also exceeded a maximum rate at which host I/O operations can be processed by the storage processor using non-volatile storage located on one or more lower performance disk drives (e.g. magnetic disk drives) in the data storage system. For example, in the case of a LUN that is used by one or more host applications to store a tax agency database, the High Activity Time Range 204 may be identified as a range of dates during which tax filings were intensively submitted during the year of Monitored Time Period 200, e.g. a time range of April 1 through April 15 during 2018.

In response to identification of the High Activity Time Range 204, the disclosed technology then defines Anticipatory Time Range 202 as a range of time immediately preceding the beginning of the High Activity Time Range 204, e.g. immediately preceding April 1. For example, Anticipatory Time Range 202 may be defined by the disclosed technology as all or a portion of the day immediately preceding April 1, e.g. March 31.

As further shown in FIG. 2, during the Anticipatory Time Range 202 within a Subsequent Time Period 206 following the Monitored Time Period 200, the disclosed technology allocates 212 high performance non-volatile storage to the LUN, such that the high performance non-volatile storage allocated to the LUN during Anticipatory Time Range 202 is available for processing host I/O operations directed to the storage object and received by the storage processor at the beginning of and throughout the High Activity Time Range 204 within Subsequent Time Period 206. For example, in an example in which Subsequent Time Period 206 is the year following the year of Monitored Time Period 200, e.g. 2019, and in which Anticipatory Time Range 202 is at least a portion of a day (e.g. March 31) immediately preceding a High Activity Time Range 204 that extends from April 1 to April 15, then the disclosed technology allocates high performance non-volatile storage to the LUN during Mar. 31, 2019, such that the high performance non-volatile storage allocated to the LUN during Mar. 31, 2019 is available for processing host I/O operations directed to the storage object that are received by the storage processor beginning on Apr. 1, 2019 and throughout the high activity time range of Apr. 1, 2019 through Apr. 15, 2019.

The disclosed technology may further operate to deallocate the high performance non-volatile storage allocated to the LUN during Anticipatory Time Range 202 in Subsequent Time Period 206 at or after the end of the High Activity Time Range 204 in Subsequent Time Period 206, e.g. at or after Apr. 15, 2019, for reallocation to one or more other LUNs.

In addition, the disclosed technology may similarly operate to allocate high performance non-volatile storage to the LUN in response to the Anticipatory Time Range 202 within further subsequent time periods, e.g. during March 31 in subsequent years 2020, 2021, and so on. In this way, while the Monitored Time Period 200 may be a single period of time, the Anticipatory Time Range 202 may be a recurring range of time occurring in multiple subsequent time periods.

Those skilled in the art will recognize that while the example of FIG. 2 provides a monitored time period and subsequent time periods that are described in terms of years, and a high activity time range and anticipatory time range that are described in terms of days, the disclosed technology is not so limited. Accordingly, alternative embodiments of the disclosed technology may use monitored time periods, subsequent time periods, high activity time ranges, and anticipatory time ranges that are provided in terms of various other time units, including but not limited to hours, minutes, or seconds.

Figure 3:
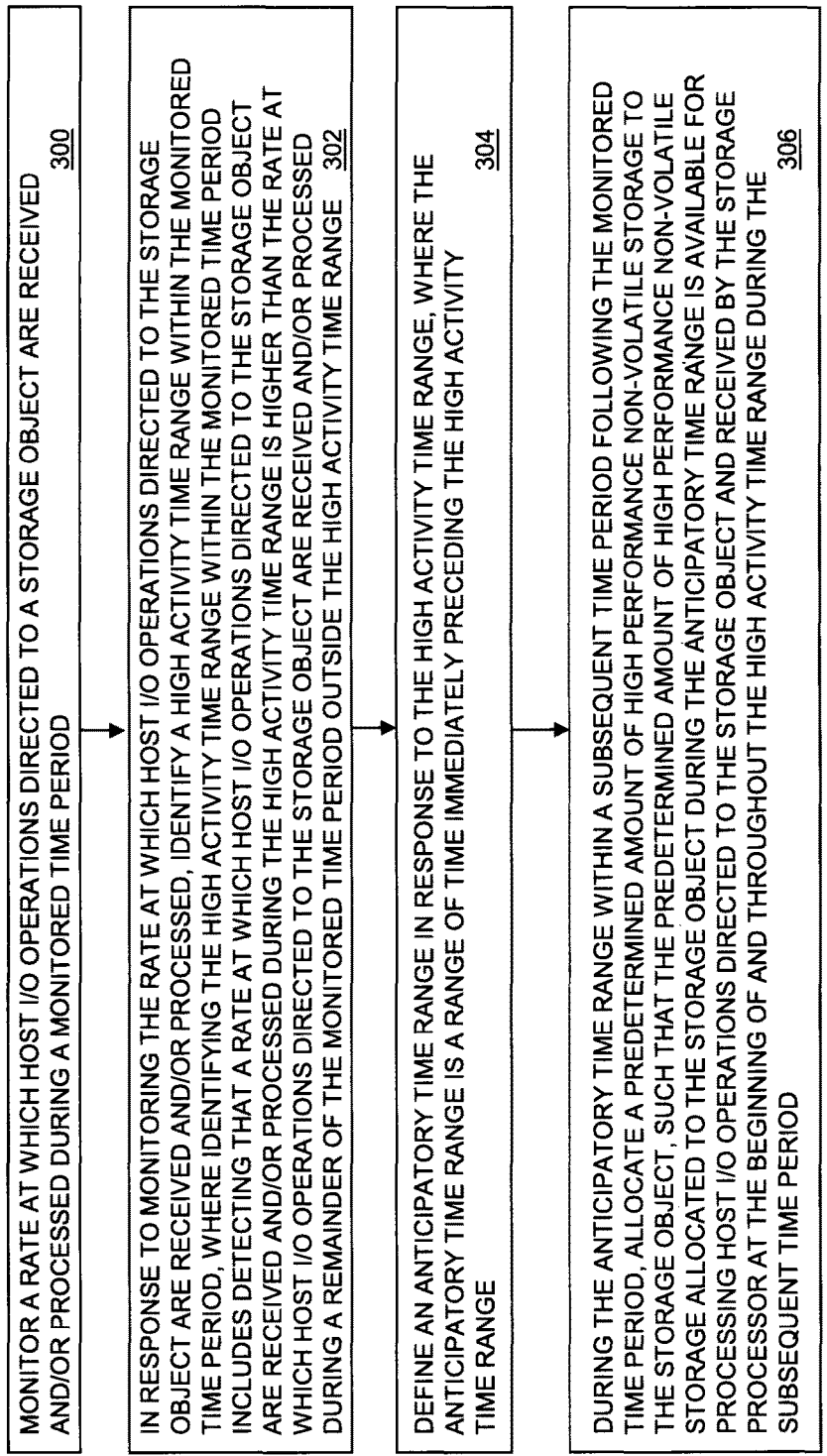
FIG. 3 is a flow chart illustrating steps performed during operation of some embodiments of the disclosed technology.

FIG. 3 is a flow chart illustrating steps performed during operation of some embodiments of the disclosed technology.

At step 300, a rate at which host I/O operations directed to a storage object are received and/or processed during a monitored time period.

At step 302, in response to the monitoring of the rate at which host I/O operations directed to the storage object are received and/or processed at step 300, a high activity time range is identified within the monitored time period. Identifying the high activity time range within the monitored time period includes detecting that a rate at which host I/O operations directed to the storage object are received and/or processed during the high activity time range is higher than the rate at which host I/O operations directed to the storage object are received and/or processed during a remainder of the monitored time period outside the high activity time range.

At step 304, an anticipatory time range is defined in response to the high activity time range. The anticipatory time range is defined as a range of time immediately preceding the high activity time range.

At step 306, during the anticipatory time range within at least one subsequent time period following the monitored time period, allocate a predetermined amount of high performance non-volatile storage to the storage object. The high performance non-volatile storage allocated to the storage object during the anticipatory time range is available for processing host I/O operations directed to the storage object and received by the storage processor at the beginning of and throughout the high activity time range during the subsequent time period(s).

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. For example, it should be understood that some data storage systems may be configured to run host applications such as Application A 180 and Application B 190 locally, i.e., in the Memory 106 of the Storage Processor 101.

As will be appreciated by one skilled in the art, aspects of the technology disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of proactively allocating data storage resources to a storage object, comprising:
monitoring a rate at which host I/O operations directed to the storage object are received during a monitored time period;
in response to monitoring the rate at which host I/O operations directed to the storage object are received, identifying a high activity time range within the monitored time period, wherein identifying the high activity time range within the monitored time period includes detecting that a rate at which host I/O operations directed to the storage object are received during the high activity time range within the monitored time period is higher than a rate at which host I/O operations directed to the storage object are received during a remainder of the monitored time period outside the high activity time range;
defining an anticipatory time range in response to the high activity time range, wherein the anticipatory time range comprises a range of time immediately preceding the high activity time range; and
during the anticipatory time range within a subsequent time period following the monitored time period, allocating a predetermined amount of high performance non-volatile storage to the storage object, wherein the predetermined amount of high performance non-volatile storage allocated to the storage object during the anticipatory time range is available for processing host I/O operations directed to the storage object at a beginning of the high activity time range during the subsequent time period.

2. The method of claim 1, further comprising
during the anticipatory time range within the subsequent time period, copying host data previously written to the storage object and currently stored in low-performance non-volatile storage previously allocated to the storage object, from the low-performance non-volatile storage previously allocated to the storage object, to the high performance non-volatile storage allocated to the storage object during the anticipatory time range, prior to the beginning of the high activity time range during the subsequent time period; and
after copying the host data previously written to the storage object and currently stored in the low-performance non-volatile storage previously allocated to the storage object from the low-performance non-volatile storage previously allocated to the storage object to the high performance non-volatile storage allocated to the storage object during the anticipatory time range, deallocating the low-performance non-volatile storage previously allocated to the storage object for re-allocation to one or more other storage objects.

3. The method of claim 2, further comprising
wherein the predetermined amount of high performance non-volatile storage allocated to the storage object during the anticipatory time range within the subsequent time period is equal in size to the amount of host data previously written to the storage object and currently stored in the low-performance non-volatile storage previously allocated to the storage object.

4. The method of claim 3, wherein the low performance non-volatile storage previously allocated to the storage object comprises non-volatile storage allocated to the storage object that is located on at least one magnetic hard disk drive.

5. The method of claim 2, further comprising
calculating a size of a working set for the storage object, wherein the size of the working set for the storage object is equal to an amount of non-volatile storage that is typically used to process host I/O operations directed to the storage object during the high activity time range; and
wherein the predetermined amount of high performance non-volatile storage allocated to the storage object during the anticipatory time range within the subsequent time period is equal in size to the size of the working set for the storage object.

6. The method of claim 2, further comprising
calculating a length of the anticipatory time range, wherein calculating the length of the anticipatory time range comprises calculating a length of time that is at least sufficient to completely copy the host data previously written to the storage object and currently stored in low-performance non-volatile storage previously allocated to the storage object, from the low-performance non-volatile storage previously allocated to the storage object, to the high performance non-volatile storage allocated to the storage object during the anticipatory time range.

7. The method of claim 1, wherein allocating the predetermined amount of high performance non-volatile storage to the storage object comprises allocating the predetermined amount of high performance non-volatile storage to the storage object from non-volatile storage that is located on at least one solid state drive.

8. The method of claim 1, wherein the monitored time period comprises single period of time; and wherein the anticipatory time range comprises a recurring range of time in multiple subsequent time periods.

9. The method of claim 1, wherein the storage object is a first storage object in a plurality of storage objects, and wherein each storage object in the plurality of storage objects has an associated type, and further comprising:
identifying a second storage object in the plurality of storage objects having the same associated type as the first storage object;
in response to identifying the second storage object having the same associated type as the first storage object, i) defining the same anticipatory time range for the second storage object as was previously defined for the first storage object, and ii) during the anticipatory time range within the subsequent time period following the monitored time period, allocating a second predetermined amount of high performance non-volatile storage to the second storage object, wherein the second predetermined amount of high performance non-volatile storage allocated to the second storage object during the anticipatory time range is available for processing host I/O operations directed to the second storage object at the beginning of the high activity time range during the subsequent time period.

10. The method of claim 1, further comprising
further in response to monitoring the rate at which host I/O operations are directed to the storage object, identifying a low activity time range within the monitored time period, wherein identifying the low activity time range within the monitored time period includes detecting that a rate at which host I/O operations are directed to the storage object during the low activity time range within the monitored time period is lower than a rate at which host I/O operations are directed to the storage object during a remainder of the monitored time period outside the low activity time range;
defining a second anticipatory time range in response to the low activity time range, wherein the second anticipatory time range comprises a range of time immediately preceding the low activity time range; and
during the second anticipatory time range within the subsequent time period following the monitored time period, allocating a predetermined amount of low performance non-volatile storage to the storage object, wherein the predetermined amount of low performance non-volatile storage allocated to the storage object during the second anticipatory time range is available for processing host I/O operations directed to the storage object at the beginning of the low activity time range during the subsequent time period.

11. The method of claim 1, further comprising
wherein the high activity time range comprises a time range during which a rate at which write host I/O operations directed to the storage object are received is higher than a rate at which write host I/O operations directed to the storage object are received during a remainder of the monitored time period outside the high activity time range; and
wherein allocating the predetermined amount of high performance non-volatile storage to the storage object during the anticipatory time range comprises allocating high performance non-volatile storage having relatively high write endurance to the storage object during the anticipatory time range.

12. A computerized apparatus, comprising:
processing circuitry;
a memory coupled to the processing circuitry, the memory storing program code for proactively allocating data storage resources to a storage object which, when executed by the processing circuitry, causes the processing circuitry to:
monitor a rate at which host I/O operations directed to the storage object are received during a monitored time period,
in response the monitored rate at which host I/O operations directed to the storage object are received, identify a high activity time range within the monitored time period, wherein the high activity time range within the monitored time period is identified by detecting that a rate at which host I/O operations directed to the storage object are received during the high activity time range within the monitored time period is higher than a rate at which host I/O operations directed to the storage object are received during a remainder of the monitored time period outside the high activity time range,
define an anticipatory time range in response to the high activity time range, wherein the anticipatory time range comprises a range of time immediately preceding the high activity time range, and
during the anticipatory time range within a subsequent time period following the monitored time period, allocate a predetermined amount of high performance non-volatile storage to the storage object, wherein the predetermined amount of high performance non-volatile storage allocated to the storage object during the anticipatory time range is available for processing host I/O operations directed to the storage object at a beginning of the high activity time range during the subsequent time period.

13. The computerized apparatus of claim 12, wherein the program code, when executed by the processing circuitry, further causes the processing circuitry to:
during the anticipatory time range within the subsequent time period, copy host data previously written to the storage object and currently stored in low-performance non-volatile storage previously allocated to the storage object, from the low-performance non-volatile storage previously allocated to the storage object, to the high performance non-volatile storage allocated to the storage object during the anticipatory time range, prior to the beginning of the high activity time range during the subsequent time period; and
after copying the host data previously written to the storage object and currently stored in the low-performance non-volatile storage previously allocated to the storage object from the low-performance non-volatile storage previously allocated to the storage object to the high performance non-volatile storage allocated to the storage object during the anticipatory time range, deallocate the low-performance non-volatile storage previously allocated to the storage object for re-allocation to one or more other storage objects.

14. The computerized apparatus of claim 13, wherein the program code, when executed by the processing circuitry, further causes the processing circuitry to:
calculate a size of the predetermined amount of high performance non-volatile storage allocated to the storage object during the anticipatory time range within the subsequent time period as a size equal to the amount of host data previously written to the storage object and currently stored in the low-performance non-volatile storage previously allocated to the storage object.

15. The computerized apparatus of claim 14, wherein the low performance non-volatile storage previously allocated to the storage object comprises non-volatile storage allocated to the storage object that is located on at least one magnetic hard disk drive.

16. The computerized apparatus of claim 13, wherein the program code, when executed by the processing circuitry, further causes the processing circuitry to:
calculate a size of a working set for the storage object, wherein the size of the working set for the storage object is equal to an amount of non-volatile storage that is typically used to process host I/O operations directed to the storage object during the high activity time range; and
wherein the predetermined amount of high performance non-volatile storage allocated to the storage object during the anticipatory time range within the subsequent time period is equal in size to the size of the working set for the storage object.

17. The computerized apparatus of claim 13, wherein the program code, when executed by the processing circuitry, further causes the processing circuitry to:
calculate a length of the anticipatory time range, wherein the length of the anticipatory time range is calculated at least in part by calculating a length of time that is at least sufficient to completely copy the host data previously written to the storage object and currently stored in low-performance non-volatile storage previously allocated to the storage object, from the low-performance non-volatile storage previously allocated to the storage object, to the high performance non-volatile storage allocated to the storage object during the anticipatory time range.

18. The computerized apparatus of claim 12, wherein the program code, when executed by the processing circuitry, further causes the processing circuitry to:
allocate the predetermined amount of high performance non-volatile storage to the storage object at least in part by allocating the predetermined amount of high performance non-volatile storage to the storage object from non-volatile storage that is located on at least one solid state drive.

19. The computerized apparatus of claim 12, wherein the storage object is a first storage object in a plurality of storage objects, and wherein each storage object in the plurality of storage objects has an associated type, and wherein the program code, when executed by the processing circuitry, further causes the processing circuitry to:
identify a second storage object in the plurality of storage objects having the same associated type as the first storage object;
in response to identification of the second storage object having the same associated type as the first storage object, i) define the same anticipatory time range for the second storage object as was previously defined for the first storage object, and ii) during the anticipatory time range within the subsequent time period following the monitored time period, allocate a second predetermined amount of high performance non-volatile storage to the second storage object, wherein the second predetermined amount of high performance non-volatile storage allocated to the second storage object during the anticipatory time range is available for processing host I/O operations directed to the second storage object at the beginning of the high activity time range during the subsequent time period.

20. A computer program product, comprising:
a non-transitory computer readable medium storing program code for proactively allocating data storage resources to a storage object, the set of instructions, when carried out by at least one processor, causing the processor to perform a method of:
monitoring a rate at which host I/O operations directed to the storage object are received during a monitored time period;
in response to monitoring the rate at which host I/O operations directed to the storage object are received, identifying a high activity time range within the monitored time period, wherein identifying the high activity time range within the monitored time period includes detecting that a rate at which host I/O operations directed to the storage object are received during the high activity time range within the monitored time period is higher than a rate at which host I/O operations directed to the storage object are received during a remainder of the monitored time period outside the high activity time range;
defining an anticipatory time range in response to the high activity time range, wherein the anticipatory time range comprises a range of time immediately preceding the high activity time range; and
during the anticipatory time range within a subsequent time period following the monitored time period, allocating a predetermined amount of high performance non-volatile storage to the storage object, wherein the predetermined amount of high performance non-volatile storage allocated to the storage object during the anticipatory time range is available for processing host I/O operations directed to the storage object at a beginning of the high activity time range during the subsequent time period.

* * * * *